Dec. 19, 1967     S. LEHRER     3,358,456
PULSED ROCKET ENGINE
Filed Nov. 13, 1964     2 Sheets-Sheet 1
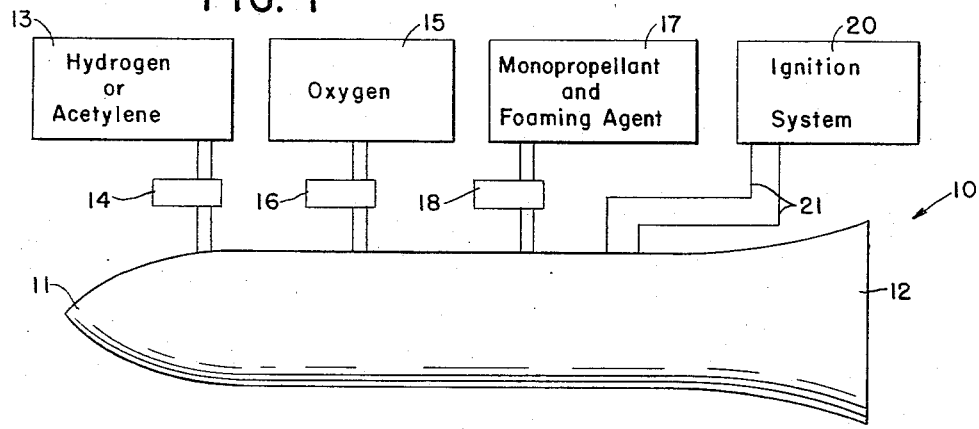
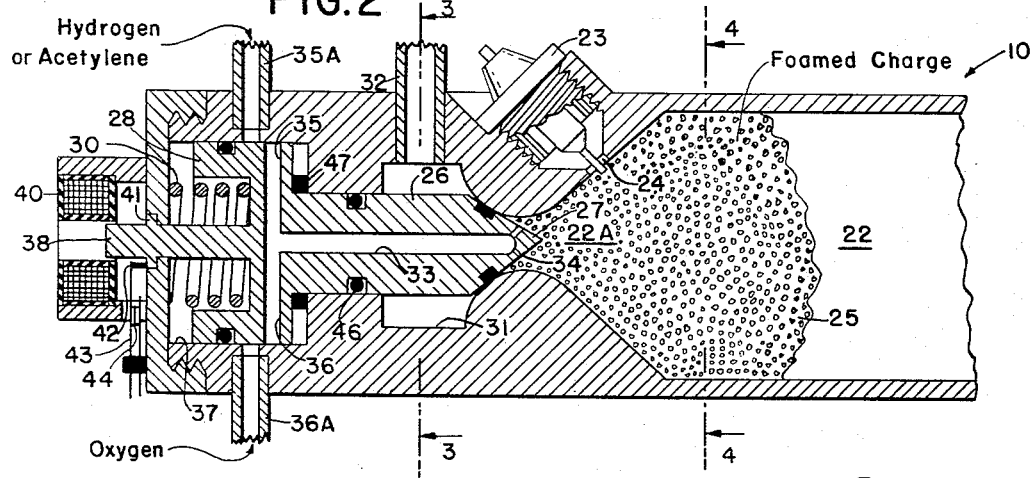
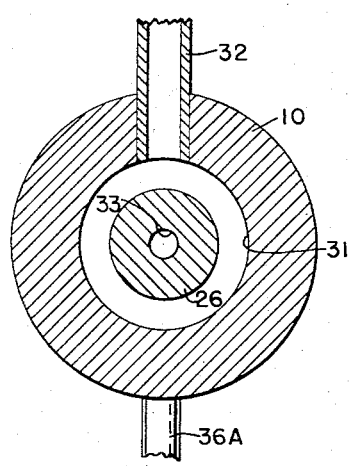
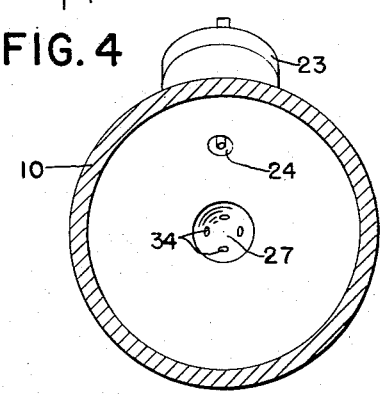
STANLEY LEHRER
INVENTOR
BY Ralph E. Bitner
ATTORNEY

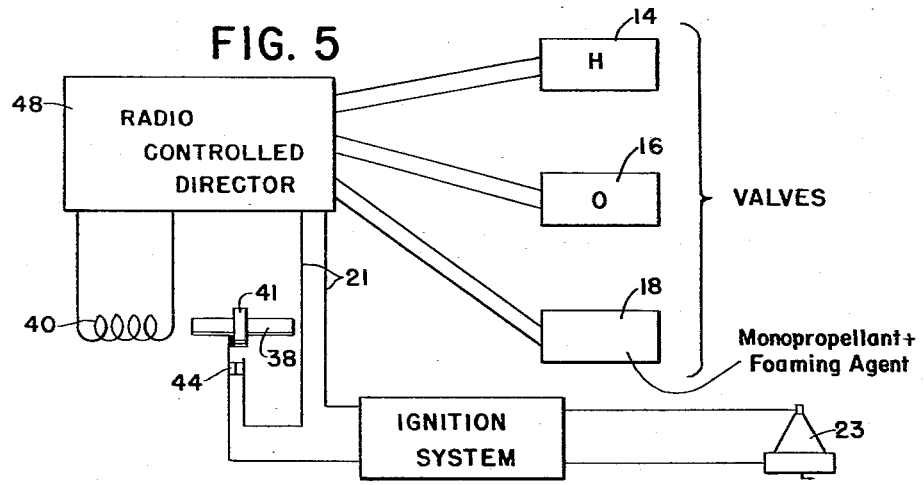
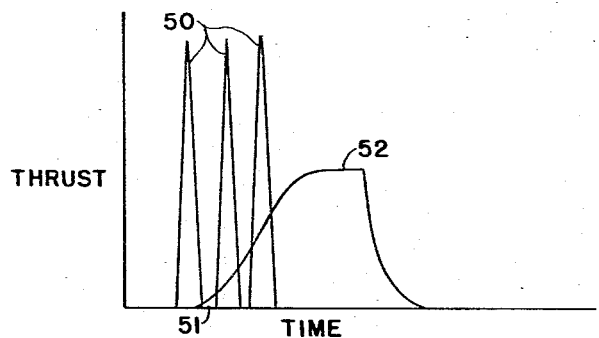
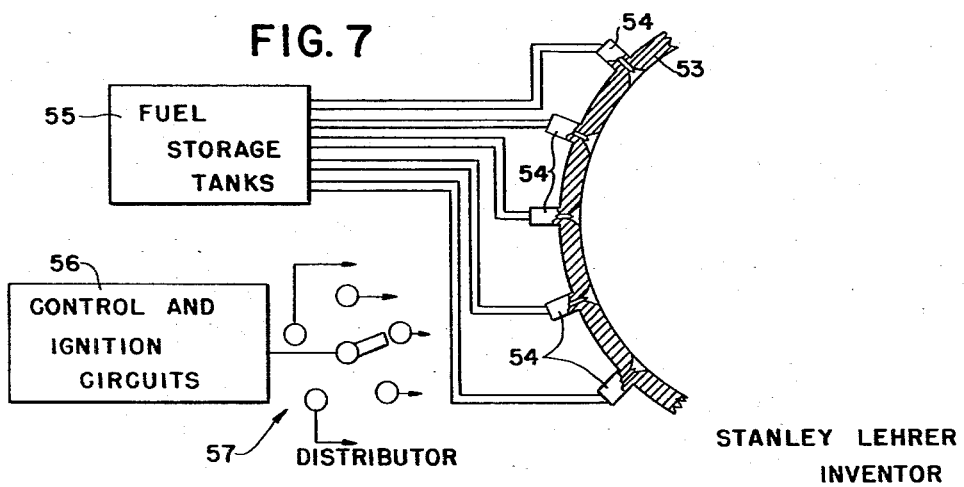
STANLEY LEHRER
INVENTOR
BY Ralph W. E. Bitner
ATTORNEY 3,358,456
PULSED ROCKET ENGINE
Stanley Lehrer, Pompton Lakes, N.J., assignor to
Astrosystems International Inc.
Filed Nov. 13, 1964, Ser. No. 411,022
8 Claims. (Cl. 60—258)

This invention relates to a rocket engine which produces a series of controllable pulses made possible by a mixture of explosive gasses and a monopropellant containing a foaming agent. The invention has particular reference to a rocket engine used for very rapid steering of a large missile powered by a conventional rocket engine.

Most rocket engines used today for missiles and other types of flying vehicles are designed to produce a steady mechanical thrust which forces the vehicle or missile along a desired path. Such engines are generally relatively slow to achieve their full power when first started and they are not designed for extremely quick response to a control signal. The present invention is directed to a rocket engine which may be used either for very rapid steering purposes or for altering the position of a missile as it travels through space. Such an engine must have an extremely quick response to a control signal and must produce a predetermined amount of mechanical thrust. These objectives are realized by inserting an explosive charge into the rocket chamber in the form of a foam comprising a mixture of explosive gasses and a monopropellant containing a foaming agent.

One of the objects of this invention is to provide an improved pulsed rocket engine which avoids one or more of the disadvantages and limitations of prior art arrangements.

Another object of the invention is to control accurately the force exerted by a rocket engine so that it may be used for a control unit to steer a missile or to change the position of a satellite with reference to another body.

Another object of the invention is to obtain a series of mechanical thrusts in discrete pulses.

Another object of the invention is to contain the explosive charge of a rocket engine in a compact form before detonation.

Another object of the invention is to increase the speed of response to a control signal for a desired thrust.

The rocket engine includes the usual combustion chamber and a detonating means which may be a spark plug connected to an ignition system. A detonable gas mixture and monopropellant containing a foaming agent are applied to the combustion chamber through a poppet valve which may be controlled to open and shut by an electromagnet. In addition to the explosive mixture, the foaming agent is mixed with the charge so that it forms a lather-like body within the combustion chamber prior to explosion.

One feature of the invention includes the use of a mechanical spring which holds the poppet valve in its closed position but permits the valve to open for a short time interval during and after the explosion to permit another charge of explosive material to enter the explosion chamber. In this manner, the engine may be adjusted to operate without the electromagnetic control.

Another feature of the invention includes the use of a pair of contacts which are connected in series with a power source which supplies the ignition system. These contacts are opened each time the poppet valve is opened so that the ignition system is disconnected and the spark plug cannot explode the mixture until the poppet valve is closed.

For a better understanding of the present invention, together with other and further objects thereof, reference is made to the following description taken in connection with the accompanying drawings.

FIG. 1 is a diagrammatic showing of the rocket engine, the supply tanks, and the ignition system.

FIG. 2 is a cross sectional view taken along the longitudinal axis of the engine, showing the combustion chamber, the spark plug, the poppet valve, and other operating components.

FIG. 3 is a cross sectional view of the engine shown in FIG. 2 and is taken along line 3—3 of that figure.

FIG. 4 is another cross sectional view of the engine shown in FIG. 2 and is taken along line 4—4 of that figure.

FIG. 5 is a schematic diagram of connections showing the solenoid operated valves, the ignition circuit and the electro-magnetic coil which is used to start the engine.

FIG. 6 is a graph showing the type of thrust pulses produced by the rocket engine in comparison to the conventional type.

FIG. 7 is a diagram which shows an alternate use of the pulsed engine. In this application a number of small engines are grouped together to produce a high intensity sonic signal.

Referring now to FIG. 1, the rocket engine is generally enclosed within a housing 10 which includes the usual forward nose 11 and the rear flared exit port 12. A fuel tank 13 is connected to the engine 10 through a solenoid valve 14 and an oxygen tank 15 is also connected to the engine in series with a second solenoid valve 16. A monopropellant containing a foaming agent is enclosed in a third storage tank 17 and is connected to the engine in series with a third valve 18. The explosion is controlled by an ignition system 20 which is connected to a spark plug by a pair of wires 21.

The details of the rocket engine are shown in FIG. 2. The engine includes the usual explosion chamber 22 and an adjoining spark plug 23 having a spark gap 24 formed integral with one of the sides of chamber 22. The foamed charge 25 is admitted to the explosion chamber 22 by a poppet valve 26 having an end portion 27 which may be in the form of a cone. The poppet valve has a generally cylindrical body as indicated in FIG. 2 and is formed with an enlarged base 28 which includes a helical spring 30 acting to exert pressure to keep the valve closed. Surrounding one portion of the valve 26, is an annular space 31 connected to a conduit 32 for the application of a monopropellant containing a foaming agent. Conduit 32 is connected to solenoid valve 18 and the control of the monopropellant containing a foaming agent is made possible by this valve. When the monopropellant and foaming agent are admitted to the explosion chamber 22, a mixing occurs at the throat 22A and the foam material 25 is formed.

The poppet valve also includes an axial conduit 33 which is terminated by a plurality of small orifices 34 leading into the combustion chamber. At the other end of conduit 33 connection is made to a fuel conduit 35 and an oxidizer conduit 36. These conduits normally are terminated by the cylindrical wall 37 in which the enlarged portion 28 of the poppet valve slides. When the poppet valve is in its open position, conduit 35 is connected to conduit 35A and conduit 36 is connected to conduit 36A. These conduits being connected to the fuel line and valve 14, and the oxidizer line and valve 16, respectively. The poppet valve also includes an axial ferromagnetic rod 38 which extends beyond the spring 30 and into the central portion of an electromagnetic winding 40. The winding 40 is positioned so that current through its coils will attract the poppet extension rod 38 and open the poppet valve.

The extension rod 38 is provided with an annular collar 41 and this collar makes contact with an insulator 42 which is connected to a flexible leaf 43 supporting one of the contacts 44 which are closed when the poppet valve is closed. When the poppet valve opens, contacts 44 are opened. The terminals of this contact arrangement are connected in series with an electrical source of power which supplies the ignition circuit so that the ignition circuit is disabled whenever the poppet valve is opened. The poppet valve is provided with an annular sealing ring 45 where the poppet valve makes contact with the throat of the explosion chamber. Also an O ring 46 may be provided around the body of the cylindrical portion 26 of the poppet valve to prevent leakage along its sliding surface. Another resilient ring 47 is provided which seats the valve in its closed position.

Referring now to FIG. 5, the complete wiring diagram for controlling the rocket engine is shown. In addition to the solenoid valves 14, 16 and 18, an ignition circuit 20 supplies the spark plug 23. The conductors 21 which supply the ignition circuit are connected in series with contacts 44 as explained above, these contacts being opened by the annular collar 41 on rod 38. Winding 40 is controlled by a control circuit 48 which may be controlled manually but, if desired, a radio signal or other guidance signal may be used to control the entire program operated by the control circuit. This control circuit 48 will not be described in detail since it is not a part of the invention.

The graph shown in FIG. 6 illustrates the type of mechanical thrust produced by the rocket engine. Each time the foamed charge is exploded, a pulse 50 of mechanical power is produced. Each pulse is followed by a short time interval 51 where no thrust at all is generated. It will be noted that the pulse 50 of power follows very closely after the ignition system detonates the charge. If this rocket engine were operated with the usual type of fuel and oxidizer control, the thrust pattern would be as indicated in curve 52, this curve showing that considerable time elapses between the ignition spark and the application of full power. It is contemplated that the control circuit 48 will be sufficiently accurate to produce any desired number of power pulses 50.

The schematic showing in FIG. 7 includes a curved focussing plate 53 having a plurality of small pulsed rocket engine components 54 inserted into its surface. The small rocket engines are fed by the usual collection of fuel and oxidizing tanks 55 and the ignition is controlled by a comprehensive circuit 56. These engines 54 may be controlled to operate in unison and explode at the same time, thereby providing a very powerful sonic pulse which may be heard for many miles. Since the explosive mixture is confined within a foaming envelope, the device may be operated under water. If the engines are to be operated one at a time, a distributor 57 may be used.

It will be obvious from the above description that the pulse rocket engine can be operated by pulses of current applied to winding 40 to open the poppet valve and thereby apply a gaseous fuel through conduit 35A, and gaseous oxidizer through conduit 36A and a monopropellant containing a foaming agent through conduit 32. As soon as the valve is closed, contacts 44 will be closed and the ignition system operates the spark plug to explode the charge. After the operation is started it continues to operate without the use of the solenoid, the explosive charge causing the poppet valve to open and send a new charge into the explosion chamber.

There are many types of monopropellants which can be used with this engine. Hydrazine, $N_2H_4$ or hydrogen peroxide $H_2O_2$ may be the monopropellant. Sodium sterate may be the foaming agent.

The foregoing disclosure and drawings are merely illustrative of the principles of this invention and are not to be interpreted in a limiting sense. The only limitations are to be determined from the scope of the appended claims.

I claim:

1. A pulsed rocket engine comprising; an explosion chamber where an explosive charge can be exploded to provide a thrust; an ignition means secured to one side of the explosion chamber for providing an electrical discharge which ignites the charge; a first conduit for conducting a monopropellant containing a foaming agent to the explosion chamber; a poppet valve positioned in a wall of the explosion chamber for admitting the monopropellant containing a foaming agent each time the valve opens; a second conduit for conducting gaseous fuel to the explosion chamber; a third conduit for conducting gaseous oxidizer to the explosion chamber; said second and third conduits terminating in orifices in the explosion end of the valve; and a resilient means secured to the poppet valve for closing the valve after an explosive charge has been admitted to the explosion chamber.

2. A pulsed rocket engine comprising: an explosion chamber where an explosive charge can be exploded to provide a thrust; an ignition means secured to one side of the explosion chamber for providing an electrical discharge which ignites the charge; a first conduit for conducting a monopropellant containing a foaming agent from a storage tank to the explosion chamber; a poppet valve positioned in a wall of the explosion chamber for admitting the monopropellant containing a foaming agent each time the valve opens; a second conduit for conducting gaseous fuel to the explosion chamber; a third conduit for conducting gaseous oxidizer to the explosion chamber; said second and third conduits terminating in orifices in the explosion end of the valve; a resilient means secured to the poppet valve for closing the valve after an explosive charge has been admitted to the explosion chamber; and an electromagnet coupled to the poppet valve for opening it when a charge is to be admitted to the chamber.

3. A pulsed rocket engine comprising: an explosion chamber where an explosive charge can be exploded to provide a thrust; an ignition means secured to one side of the explosion chamber for providing an electrical discharge which ignites the charge; a first conduit for conducting a monopropellant containing a foaming agent from a first storage tank to the explosion chamber; a poppet valve positioned in a wall of the explosion chamber for admitting the monopropellant containing a foaming agent each time the valve opens; a second conduit for conducting gaseous fuel from a second storage tank to the explosion chamber; a third conduit for conducting gaseous oxidizer from a third storage tank to the explosion chamber; said second and third conduits joining in a common conduit prior to entering the explosion chamber; a resilient means secured to the poppet valve for closing the valve after an explosive charge has been admitted to said chamber; and an electromagnet coupled to the poppet valve for opening it when a charge is to be admitted to the chamber.

4. A rocket engine as claimed in claim 3 wherein said ignition means is a spark plug having spaced electrodes for the passage of a high voltage discharge.

5. A rocket engine as claimed in claim 3 wherein said ignition means is a conduction plug including a semiconductor discharge element clamped between two conductive terminals.

6. A rocket engine as claimed in claim 3 wherein said explosion chamber includes a hollow cylindrical portion and wherein said poppet valve is mounted in axial alignment with the cylinder.

7. A rocket engine as claimed in claim 3 wherein said poppet valve includes a cylindrical movable member and wherein a conduit for a mixture of explosive fluids is positioned in axial alignment within said cylindrical member.

8. A rocket engine as claimed in claim 3 wherein a source of electrical power is provided for said ignition means and wherein a pair of normally closed contacts is connected in series between the source of power and the ignition means, said contacts mechanically coupled to the poppet valve and opened when the valve is opened.

References Cited

UNITED STATES PATENTS 3,100,963   8/1963   Michel _____ 60—35.6

MARK M. NEWMAN, *Primary Examiner.*

D. HART, *Assistant Examiner.*